(12) United States Patent
Schwengler et al.

(10) Patent No.: US 9,930,185 B2
(45) Date of Patent: Mar. 27, 2018

(54) POTS TELEPHONY OVER HIGH SPEED DATA NETWORKS

(71) Applicant: CenturyLink Intellectual Property LLC, Denver, CO (US)

(72) Inventors: Thomas Schwengler, Lakewood, CO (US); Michael L. Elford, Calhoun, CO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

(21) Appl. No.: 15/398,535

(22) Filed: Jan. 4, 2017

(65) Prior Publication Data

US 2017/0118351 A1    Apr. 27, 2017

Related U.S. Application Data

(62) Division of application No. 14/175,762, filed on Feb. 7, 2014, now Pat. No. 9,571,662.

(Continued)

(51) Int. Cl.
*H04L 12/66* (2006.01)
*H04M 11/06* (2006.01)
*H04L 27/00* (2006.01)
*H04L 25/08* (2006.01)
*H04M 7/00* (2006.01)

(52) U.S. Cl.
CPC ......... *H04M 11/062* (2013.01); *H04L 25/085* (2013.01); *H04L 27/0006* (2013.01); *H04M 7/0069* (2013.01)

(58) Field of Classification Search
CPC .......... H04L 25/085; H04L 27/0006; H04M 11/062; H04M 7/0069
See application file for complete search history.

(56) References Cited

U.S. PATENT DOCUMENTS 5,577,066 A    11/1996  Schuchman et al.
5,883,941 A    3/1999   Akers
(Continued)

OTHER PUBLICATIONS

U.S. Appl. No. 14/175,762; Issue Notification dated Jan. 25, 2017; 1 page.

(Continued)

*Primary Examiner* — Kan Yuen
(74) *Attorney, Agent, or Firm* — Swanson & Bratschun, L.L.C.

(57) ABSTRACT

Novel tools and techniques are provided for delivering plain old telephone service ("POTS") telephony over high speed data networks. In particular, various embodiments provide tools and techniques for concurrent transmission of POTS voice signals and data signals over the same wire(s) of high-speed data lines or data cables. Various systems and methods might, in some instances, utilize upbanding or rebanding of the POTS voice band to a higher frequency band above the data stream band spectrum for transport of voice concurrent with data over the same wire(s) in the cable. The system might comprise interface devices at either end of a cable segment, one interface device to reband the voice signal and to combine the voice signal with the data signal for each dual-transport wire in the cable, and another interface device at the other end to separate the voice signal from the data signal.

16 Claims, 10 Drawing Sheets

Related U.S. Application Data

(60) Provisional application No. 61/867,465, filed on Aug. 19, 2013.

(56) References Cited

U.S. PATENT DOCUMENTS

| | | | | |
|---|---|---|---|---|
| 5,889,856 | A | * | 3/1999 | O'Toole ............... H04L 5/023 370/480 |
| 5,970,066 | A | * | 10/1999 | Lowry ............... H04M 11/062 370/353 |
| 6,574,236 | B1 | * | 6/2003 | Gosselin ............ H04M 11/062 370/465 |
| 6,700,927 | B1 | * | 3/2004 | Esliger ............... H04L 1/0003 375/219 |
| 7,346,158 | B1 | | 3/2008 | Naidu |
| 9,571,662 | B2 | | 2/2017 | Schwengler et al. |
| 2001/0021185 | A1 | | 9/2001 | Heusala |
| 2006/0269252 | A1 | * | 11/2006 | Ozawa ............. H03H 21/0023 386/201 |
| 2008/0146270 | A1 | | 6/2008 | Rofougaran |
| 2008/0300002 | A1 | | 12/2008 | Sheffer |
| 2010/0020789 | A1 | | 1/2010 | Mueller et al. |
| 2015/0049756 | A1 | | 2/2015 | Schwengler et al. |

OTHER PUBLICATIONS

U.S. Appl. No. 14/175,762; Non-Final Rejection dated May 19, 2016; 30 pages.

U.S. Appl. No. 14/175,762; Notice of Allowance dated Oct. 4, 2016; 37 pages.

U.S. Appl. No. 14/175,762; Requirement for Restriction/Election dated Nov. 5, 2015; 6 pages.

\* cited by examiner

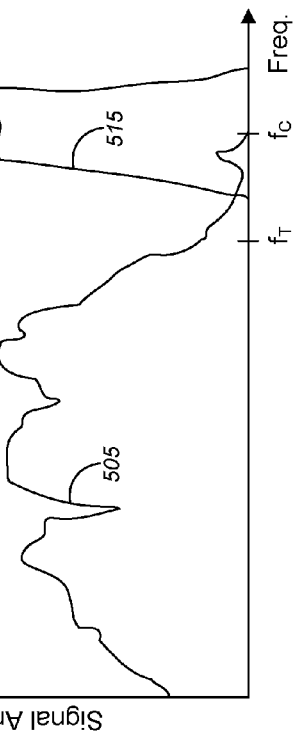
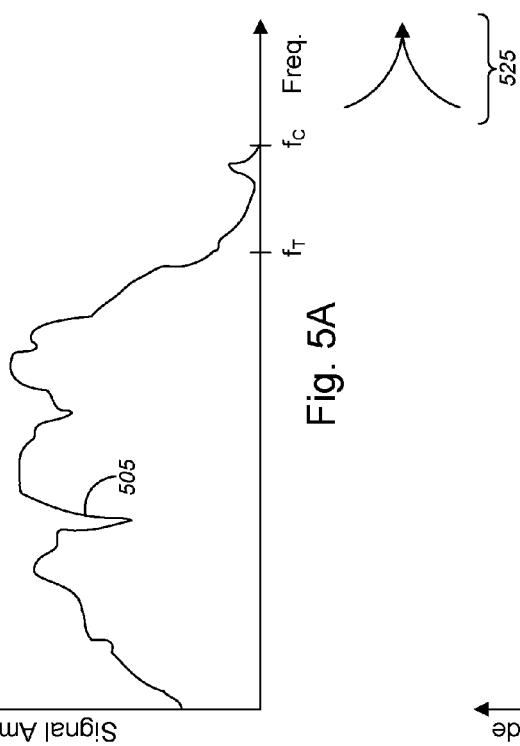
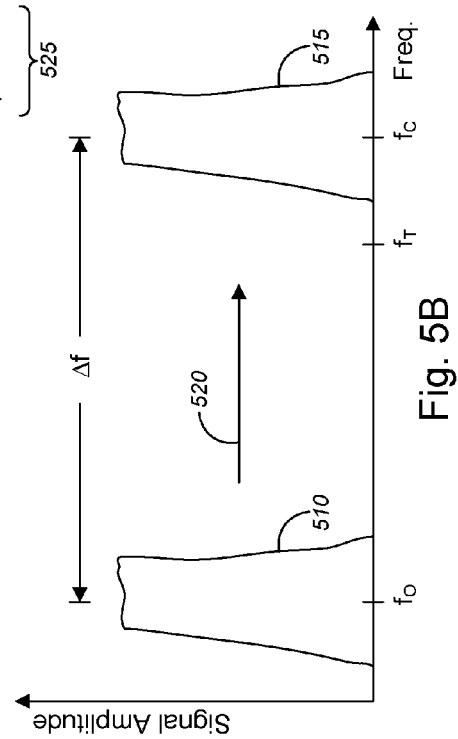
Fig. 5A
Fig. 5B
Fig. 5C

POTS TELEPHONY OVER HIGH SPEED DATA NETWORKS

CROSS-REFERENCES TO RELATED APPLICATIONS

This application is a divisional application of U.S. patent application Ser. No. 14/175,762 (the "'762 application"), filed Feb. 7, 2014 by Thomas Schwengler et al., entitled, "POTS Telephony over High Speed Data Networks," which claims priority to U.S. Patent Application Ser. No. 61/867,465 (the "'465 application"), filed Aug. 19, 2013 by Thomas Schwengler et al., entitled, "POTS Telephony over High Speed Data Networks," the entire teachings of which are incorporated herein by reference in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, apparatus, and computer software for delivering plain old telephone service ("POTS") telephony over high speed data networks, and more particularly, to methods, systems, apparatus, and computer software for delivering plain old telephone service ("POTS") voice signals and data signals over the same wire(s) in a data cable.

BACKGROUND

While devices exist to combine local area network ("LAN"), voice, and/or digital subscriber line ("DSL") service over multiple wires existing in homes, such devices rely on splitting conducting pairs for the various services. Other systems combine LAN data stream over power lines, coaxial cables, or other existing wires. Systems also exist for combining electrical power signals with voice signals over voice transmission cables. No existing solutions, however, appear to be capable of combining a plain old telephone service ("POTS") voice line over the same wire(s) of a Cat 5 or Cat 6 cable, or similar cable that is(are) concurrently being used for 1 Gbps, 10 Gbps, or higher speeds (i.e. using all of the wires provided in the cable for data signals).

Hence, there is a need for more robust and scalable solutions for combining POTS telephony over high speed data networks.

BRIEF SUMMARY

Various embodiments provide tools and techniques for delivering plain old telephone service ("POTS") telephony over high speed data networks, or otherwise enabling voice transmission over high-speed data lines, such as those found in the premise wiring of a subscriber premises, concurrent with transmission of data signals over the same wire(s) of such high-speed data lines.

Various systems and methods described herein transport voice over wires that are used for high speed data transmission (e.g., high speed local area network ("LAN") data transmission, or the like). In conventional cases, a 10/100 bT standard over different conducting pairs of wires may be used. However, for 1 Gbps speeds or higher, LAN cables use all 4 pairs of wires (i.e., 8 wires) in the typical RJ45 cable, so that the technique of using different conducting pairs is not possible. Rather, the various systems and methods might, in some instances, utilize rebanding of the POTS voice band to a higher band above the data stream band spectrum for transport of voice concurrent with data over the same wire(s) in the cable. The system might comprise interface devices at either end of a cable segment, one interface device to reband the voice signal and to combine the voice signal with the data signal for each dual-transport wire in the cable, and another interface device at the other end to separate the voice signal from the data signal. In some cases, such dual transport of voice signal and data signal can be implemented in this fashion or similar fashion over an existing Cat 5 or Cat 5e cable. Alternatively, other cables, including, but not limited to, Cat 6, Cat 6a, Cat 7, Cat 7a, or any other suitable data cable may be used.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

In an aspect, a method might comprise transmitting data signals at a first frequency band over a first wire in a data cable in a data network. The method might further comprise transmitting plain old telephone service ("POTS") voice signals at a second frequency band, which is different from the first frequency band, over the first wire in the data cable in the data network, concurrent with transmission of the data signals over the first wire.

In some embodiments, the data cable employed in the data network might include one or more of Category 5 ("Cat 5") twisted pair cable, Enhanced Category 5 ("Cat 5e") twisted pair cable, Category 6 ("Cat 6") twisted pair cable, Augmented Category 6 ("Cat 6a") twisted pair cable, Category 7 ("Cat 7") twisted pair cable, and/or Augmented Category 7 ("Cat 7a") twisted pair cable. In some instances, the data network might employ all pairs of wires in the twisted pair cable for transmitting the data signals.

According to some embodiments, the method might further comprise upbanding the POTS voice signals over a specified frequency threshold before transmitting the POTS voice signals at the second frequency band. In some cases, the specified frequency threshold might be 100 MHz. In some other cases, the specified frequency threshold might be 250 MHz. Merely by way of example, the method, in some aspects, might further comprise scanning the data network for noise to identify an appropriate spectrum to which to upband the POTS voice signals. Identifying an appropriate spectrum might, in some instances, comprise monitoring frequencies above the specified frequency threshold to identify a center frequency at which a minimal amount of signal is detected. In such instances, upbanding the POTS voice signals might comprise upbanding the POTS voice signals such that the second frequency band is centered about the center frequency.

In some embodiments, the method might further comprise performing signal processing on the upbanded POTS voice signals for interference mitigation. In some cases, performing signal processing on the upbanded POTS voice signals for interference mitigation might comprise duplicating the upbanded POTS voice signals and transmitting the duplicated upbanded POTS voice signals over two or more wires in the data cable in the data network. In other cases, performing signal processing on the upbanded POTS voice signals for interference mitigation might comprise identifying a pair of wires in the data cable having the least interference level, and transmitting the upbanded POTS voice signals over the identified pair of wires in the cable. In some instances, signal processing might comprise implementing one or more of spread spectrum techniques, error correction techniques, and/or notch filtering techniques.

The data network can be a local area network ("LAN"), in some examples. In some cases, the data network can be one of a 1 Gbps Ethernet network or a 10 Gbps Ethernet network.

According to some embodiments, the method might further comprise receiving the POTS voice signals from a transmitting POTS telephone. Alternatively, or in addition, the method might further comprise receiving the POTS voice signals from a POTS telephone network. In some instances, the method might comprise receiving the upbanded POTS voice signals over the data network, and retrieving the POTS voice signals by downbanding the upbanded POTS voice signals. The method might further comprise providing the retrieved POTS voice signals to a receiving POTS telephone. Alternatively, or additionally, the method might further comprise providing the retrieved POTS voice signals to a POTS telephone network.

In another aspect, an apparatus might comprise a first input configured to receive data signals at a first frequency band over at least one wire in a data cable in a data network, and a second input configured to receive plain old telephone service ("POTS") voice signals. The apparatus might further comprise a frequency shifter configured to upband the POTS voice signals received at the second input to a second frequency band, which is different from the first frequency band. In some cases, the apparatus might comprise a signal combiner (hereinafter referred to as a "combiner") configured to combine the data signals at the first frequency band received at the first input with the upbanded POTS voice signals at the second frequency band over the at least one wire in the data cable.

According to some embodiments, the apparatus might further comprise a spectrum analyzer configured to monitor frequencies above a specified frequency threshold for a center frequency at which a minimal amount of signal is detected. The spectrum analyzer might be further configured to send a control signal to the frequency shifter to upband the POTS voice signals such that the second frequency band is centered about the center frequency. In some embodiments, the apparatus might further comprise a signal splitter (which might include, without limitation, a demultiplexer and/or the like; hereinafter referred to as a "splitter") configured to separate the data signals at the first frequency band from the upbanded POTS voice signals at the second frequency band, after transmission through the data cable in the data network. The frequency shifter might be further configured to downband the upbanded POTS voice signals after the upbanded POTS voice signals are separated from the data signals by the splitter.

In yet another aspect, a computer system might comprise one or more processors and a non-transitory computer readable medium in communication with the one or more processors. The computer readable medium might have encoded thereon a set of instructions that, when executed by the one or more processors, causes the computer system to perform one or more operations. The set of instructions might comprise instructions for transmitting data signals at a first frequency band over a first wire in a data cable in a data network. The set of instructions might further comprise instructions for transmitting plain old telephone service ("POTS") voice signals at a second frequency band, which is different from the first frequency band, over the first wire in the data cable in a data network, concurrent with transmission of the data signals over the first wire.

In still another aspect, a method might comprise transmitting plain old telephone service ("POTS") voice signals on a data network.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 5A-5C are graphical illustrations showing combination of POTS telephony signals and data signals for concurrent transmission over the same wire(s) of a high speed data cable, in accordance with various embodiments.

DETAILED DESCRIPTION OF CERTAIN EMBODIMENTS

Figure 1:
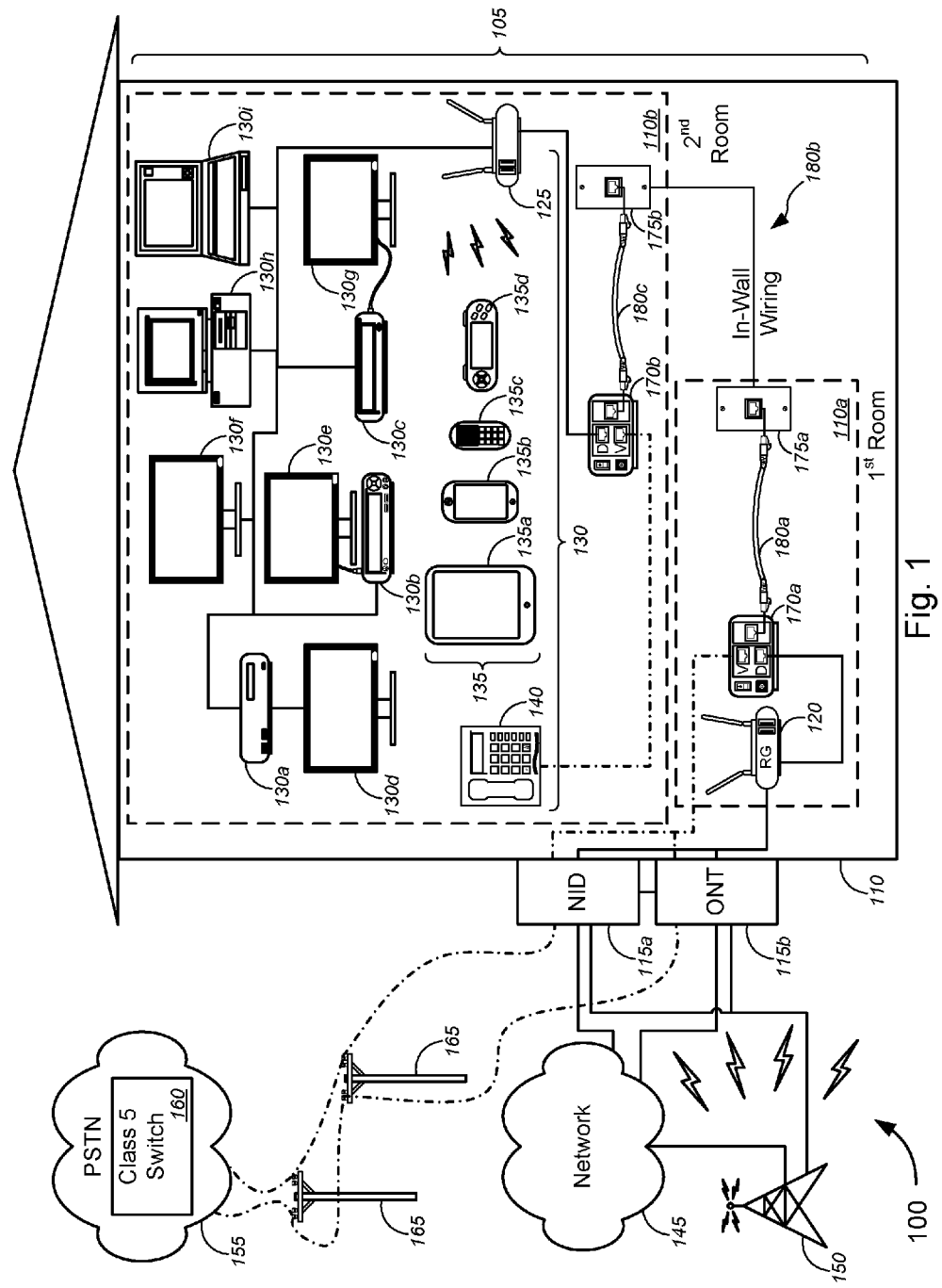
FIG. 1 is a general schematic diagram illustrating a system for delivering plain old telephone service ("POTS") telephony over high speed data networks, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments provide tools and techniques for delivering plain old telephone service ("POTS") telephony over high speed data networks, or otherwise enabling voice transmission over high-speed data lines, such as those found in the premise wiring of a subscriber premises. In particular, various embodiments provide tools and techniques for concurrent transmission of POTS voice signals and data signals over the same wire(s) of high-speed data lines/cables.

Herein, concurrent transmission of POTS voice signals and data signals over the same wires of high-speed data lines/cables might refer to duplicated POTS voice signals, one copy of which is combined with a first data signal over a first wire (or first wire pair) of the data cable, while another copy of which is combined with a second data signal (which may be the same as or different from the first data signal) over a second wire (or second wire pair) of the data cable. In some cases, the POTS voice signals might be two different signals, one combined with the first data signal over the first wire (or first wire pair) of the data cable, while the other might be combined with the second data signal over the second wire (or second wire pair) of the data cable. Although these examples use two data signals and two (either same or different) POTS voice signals, any number of POTS voice signals and data signals (and/or copies thereof) that can all be separately transmitted over the wires of the data cable (i.e., 8 wires in Cat 5, Cat 5e, Cat 6, Cat 6a, Cat 7, Cat 7a, or similar cables) may be implemented.

One set of embodiments takes the telephony spectrum, rebands it to a higher frequency that does not interfere with high speed LAN data spectrum, transmits the rebanded telephony signals, and retrieves the signals after reception on the other side. The drawings illustrate features and characteristics of various embodiments; no such features and characteristics, however, should be considered required by every embodiment, and different embodiments can combine and/or omit any or all of the disclosed features and characteristics. Providing POTS lines and data at 1 Gbps is of value to telecommunication providers in many areas, such as homes or multiple dwelling units ("MDU") served with a passive optical network ("PON"). In many existing installations [including, without limitation, brownfield cases, in which industrial or commercial facilities are converted (and in some cases decontaminated or otherwise remediated) into residential buildings (or other commercial facilities; e.g., commercial offices, etc.)], only one Cat 5 (or Cat 5e, or Cat 6) Ethernet cable might exist to, or within, the home or apartment, or the like. Providing both POTS lines and high speed data over one existing cable can provide substantial cost savings over installing new lines. In high-speed data networks, however, all wires (or twisted pairs of wires) are used for transmission of high-speed data (e.g., 1 Gbps or higher). Hence, transmitting POTS voice signals over the same wire(s) over which the high-speed data signals are transmitted allows for achieving such advantages and benefits.

Various embodiments can provide systems and methods to combine POTS and data network over the same cable (and, in particular, over the same wire(s) in the same cable). In some cases, these methods and systems might upband voice spectrum, depending on LAN speed, to above 100 MHz (for 1 Gbps Ethernet) or 250 MHz (for 10 Gbps Ethernet). Additionally, because LAN standards are notorious for producing noise above their allocated spectrum, some embodiments can employ scanning features to find the optimum band for transport. Some embodiments might include signal processing for added interference mitigation, such as spread spectrum, forward error correction, notch filtering, and the like.

Herein, "10BASE-T" or "10 bT" might refer to baseband transmission (or baseband digital transmission) at speeds of 10 Mbps, over twisted pair cable. In particular, the leading number (in this case, "10") refers to transmission speed in Mbps, while "BASE" or "b" refers to baseband transmission, and "T" designates twisted pair cable, where the pair of wires for each signal is twisted together to reduce radio frequency ("rf") interference and crosstalk between the pairs of wires. To distinguish between several standards for the same transmission speed, a letter or digit might follow or replace the "T" (e.g., "TX," "SX," "5," etc.). In a similar manner, "100BASE-T" or "100 bT" might refer to baseband (digital) transmission at speeds of 100 Mbps, over twisted pair cable, while "1000BASE-T" or "1000 bT" might refer to baseband (digital) transmission at speeds of 1 Gbps, over twisted pair cable, and so on.

Baseband (digital) transmission, in some instances, might imply that a line code and an unfiltered wire are used. Digital baseband transmission, also known as "line coding," aims at transferring a digital bit stream over a baseband channel, typically an unfiltered wire, which differs from passband transmission. Passband transmission, also known as "carrier-modulated transmission," makes communication possible over a bandpass filtered channel, such as a telephone network local-loop or a band-limited wireless channel. A baseband channel or lowpass channel (or system, or network) is a communication channel that can transfer frequencies that are very near zero. Examples include serial cables and local area networks ("LANs"), as opposed to passband channels such as radio frequency channels and passband filtered wires of the analog telephone network. Frequency division multiplexing ("FDM") allows an analog telephone wire to carry a baseband telephone call, concurrently, as one or several carrier-modulated telephone calls.

10 bT and 100 bT Ethernet only require two twisted pairs of wires to operate—pins/wires 1 and 2, and pins/wires 3 and 6. A Cat 5 cable has four twisted pairs of cables; hence, it is possible, but not standards compliant, to run two network connections, to use spare pairs for power over Ethernet ("PoE"), to run a network connection and two phone lines, or the like, over the Cat 5 cable by using the normally unused pairs (pins/wires 4 and 5, and pins/wires 7 and 8) in 10 Mbps and 100 Mbps configurations. In practice, however, most 10/100 Mbps hubs, switches, and personal computers ("PCs") electrically terminate the unused pins/wires, thus great care must be taken to separate these pairs. Moreover, as discussed above, 1000 bT or higher standards require all four pairs to operate—pins/wires 1 and 2, pins/wires 3 and 6, as well as pins/wires 4 and 5, and pins/wires 7 and 8.

The standards governing 10 bT, 100 bTX, 1000 bT, and 10 GbT (or 10000 bT) are IEEE 802.3i (1990), IEEE 802.3u (1995), IEEE 802.3ab (1999), and IEEE 802.3an (2006), respectively. A 10 bT transmitter typically sends two differential voltages, at +2.5V or −2.5V, while a 100 bTX transmitter might send three differential voltages, at +1V, 0V, or −1V. A 100 bTX transmitter might follow the same wiring patterns as 10 bT, but might be more sensitive to wire quality and wire length, due to the higher bit rates transmitted. A 1000 bT scheme might utilize all four pairs bi-directionally; in some cases, the standard might include auto medium dependent interface crossover ("MDIX") implementation, which is an optional implementation that automatically detects whether a connection would require a crossover and automatically chooses the MDI or MDIX configuration to properly match the ends of the connection link. The IEEE 802.3ab standard for the 1000 bT scheme might require Cat 5e unshielded twisted pair ("UTP") or four dimensions using pulse amplitude modulation ("4D-PAM") with five voltages, −2V, −1V, 0V, +1V, and +2V. While the +2V to −2V voltage may appear at the pins of a line driver, the voltage on the cable is nominally −1V, −0.5V, 0V, +0.5V, and +1V. 100 bTX and 1000 bT were both designed to require a minimum of Cat 5 cable and also specify a maximum cable length of 100 meters. Cat 5 cable has since been superseded and new installations use Cat 5e; however, existing installations (e.g., older residences, older commercial offices, and/or brownfield installations) might still contain Cat 5 cables.

We now turn to the embodiments as illustrated by the drawings. FIGS. 1-7 illustrate some of the features of the method, system, and apparatus for enabling voice transmission over high-speed data lines (such as those found in the premise wiring of a subscriber premises), and in some cases delivering plain old telephone service ("POTS") telephony over high speed data networks, as referred to above. The methods, systems, and apparatuses illustrated by FIGS. 1-7 refer to examples of different embodiments that include various components and steps, which can be considered alternatives or which can be used in conjunction with one another in the various embodiments. The description of the illustrated methods, systems, and apparatuses shown in FIGS. 1-7 is provided for purposes of illustration and should not be considered to limit the scope of the different embodiments.

With reference to the figures, FIG. 1 is a general schematic diagram illustrating a system 100 for delivering plain old telephone service ("POTS") telephony over high speed data networks, in accordance with various embodiments. In FIG. 1, system 100 might comprise one or more customer premises equipment ("CPE") 105 located in or at a customer premises 110, which might include one or more rooms 110a, 110b. The one or more CPE 105 might comprise a network interface device ("NID") 115a and/or an optical network terminal ("ONT") 115b (collectively, "network interface terminals 115"). The one or more CPE 105 might further comprise a modem or residential gateway ("RG") 120, one or more routers 125, and one or more user devices 130. The one or more routers 125 might include any suitable data distribution device, including, without limitation, one or more routers, one or more switches, one or more hubs, one or more access points, and/or the like.

The one or more user devices 130 might comprise gaming console 130a, digital video recording and playback device ("DVR") 130b, set-top or set-back box ("STB") 130c, one or more television sets ("TVs") 130d-130g, desktop computer 130h, laptop computer 130i, one or more mobile user devices 135, and one or more telephone handsets 140. The one or more TVs 130d-130g might include any combination of a high-definition ("HD") television, an Internet Protocol television ("IPTV"), and a cable television, and/or the like, where one or both of HDTV and IPTV may be interactive TVs. The one or more mobile user devices 135 might comprise one or more tablet computers 135a, one or more smart phones 135b, one or more mobile phones 135c, or one or more portable gaming devices 135d, and/or the like. The one or more telephone handsets 140 might include, but is not limited to, a counter-top telephone, a wall-mounted telephone, a corded telephone, a cordless telephone, and/or the like.

In some embodiments, system 100 might further comprise network 145, one or more telecommunications relay systems 150, a public switched telephone network ("PSTN") 155, a Class 5 Switch 160, one or more telephone relay systems 165, and/or the like. Network 145 might include, but is not limited to, an access network, a service provider network, a wide area network ("WAN"), a wireless WAN ("WWAN"), the Internet, or other suitable network, and/or the like. The one or more telecommunications relay systems 150 might include, without limitation, one or more wireless network interfaces (e.g., wireless modems, wireless access points, and/or the like), one or more towers, one or more satellites, and/or the like. The one or more telephone relay systems 165 might include, but is not limited to, telephone poles, utility poles, and/or the like.

In system 100, in some aspects, data might be transported either wirelessly or via wired connection directly from network 145 (and/or indirectly via the one or more telecommunications relay systems 150) to the NID 115a and/or the ONT 115b, as illustrated by the solid line connections and/or the lightning bolt symbols in FIGS. 1-3. Meanwhile, plain old telephone service ("POTS") voice signals might be transported over the one or more telephone relay systems 165 to the NID 115a and/or the ONT 115b, as illustrated by the dot-dash lines in FIGS. 1-3.

According to some aspects, system 100 might further comprise one or more interface devices 170, one or more outlets 175, and/or one or more data cables 180. In some instances, the one or more interface devices 170 might include at least a first interface device 170*a* and a second interface device 170*b*. The one or more outlets 175 might include at least a first outlet 175*a* and a second outlet 175*b*, each or both of which might include a wall-mounted outlet, which in some cases might be referred to as a data jack or a data cable jack, or the like. The one or more data cables 180 might include one or more of Category 5 ("Cat 5") twisted pair cable, Enhanced Category 5 ("Cat 5e") twisted pair cable, Category 6 ("Cat 6") twisted pair cable, Augmented Category 6 ("Cat 6a") twisted pair cable, Category 7 ("Cat 7") twisted pair cable, Augmented Category 7 ("Cat 7a") twisted pair cable, and/or the like.

In operation, according to some embodiments, in an inbound and downloading state, a data signal (or data packets) might originate from a source in (or in communication with) network 145 (such as the Internet), and might be transmitted to RG 120 (in some cases, via the one or more telecommunications relay system 150), via NID 115*a* and/or ONT 115*b*. A data cable (not unlike data cable 180) might connect the RG 120 with a data (input) port of the first interface device 170*a*. Meanwhile, a POTS voice signal might be transmitted through PSTN 155, via Class 5 Switch 160, via telephone relay system 165, and via NID 115*a* and/or ONT 115*b*. As with the data signal, a telephone cable (which in some cases might be a data cable similar to data cable 180) might connect the telephone ports of the NID 115*a* and/or ONT 115*b* to a telephone/voice (input) port of the first interface device 170*a*. As described in detail in FIGS. 3-6 below, the first interface device 170*a* might upband or reband the POTS voice signal such that the POTS voice signal is centered about a center frequency ($f_C$) of the POTS voice signal. The $f_C$ is determined, predetermined, and/or set to exceed a threshold frequency ($f_T$), above which minimal data signal may be detected. In some cases, the frequencies (typically above the $f_T$) of signal carried by a particular wire(s) in the data cable (similar to data cable 180) might be periodically, occasionally, or continually monitored to identify a center frequency at which a minimal amount of signal is detected. In such a manner, the center frequency ($f_C$) might be a dynamic value. In some embodiments, the $f_T$ might be a set/fixed value for certain speeds (e.g., 100 MHz for 1 Gbps Ethernet, 250 MHz for 10 Gbps Ethernet, 600 MHz for 10 Gbps Ethernet utilizing a Cat 7 cable, 1000 MHz for 100 Gbps Ethernet utilizing a Cat 7a cable, and/or the like), or might be a dynamic value that is adjusted based at least in part on monitoring of the frequencies to determine data signal levels below a predetermined level (which might be associated with an acceptable loss level (e.g., acceptable noise level and/or the like)).

The first interface device 170*a* might subsequently combine the upbanded or rebanded POTS voice signal with the data signal (e.g., via an appropriate combiner, multiplexer, or the like) onto the same wire(s) of data cable 180*a*, which may be communicatively coupled with in-wall wiring (such as data cable 180*b*) via the first wall-mounted outlet 175*a* in the first room 110*a*. The in-wall data cable 180*b* might be in communication with data cable 180*c* via the second wall-mounted outlet 175*b* in the second room 110*b*.

After transmission through in-wall data cable 180*b*, the combined signal might be transmitted through data cable 180*c* to the second interface device 170*b*. The second interface device 170*b* might separate the upbanded or rebanded POTS voice signal from the data signal (e.g., via an appropriate splitter, demultiplexer, or the like). The separated data signal may then be transmitted to the one or more routers 125, to be relayed either wirelessly or via wired connection to the one or more user devices 130 (including the one or more mobile user devices 135). Meanwhile, the second interface device 170*b* might downband or reband the POTS voice signal to the original frequency. In some embodiments, both the first interface device 170*a* and the second interface device 170*b* might be set to upband the POTS voice signal from an original center frequency ($f_O$) to a particular center frequency ($f_C$), which may be predetermined for the particular level of Ethernet speed (e.g., a frequency above the threshold values ($f_T$) of 100 MHz for 1 Gbps Ethernet, 250 MHz for 10 Gbps Ethernet, 600 MHz for 10 Gbps Ethernet utilizing a Cat 7 cable, 1000 MHz for 100 Gbps Ethernet utilizing a Cat 7a cable, and/or the like), and to downband the upbanded POTS voice signal by the difference ($\Delta f$) between the $f_O$ and the $f_C$. In alternative embodiments, such as the dynamically determined (i.e., monitored) $f_C$ embodiments described above, the first interface device 170*a* and the second interface device 170*b* might be communicatively coupled (e.g., via wireless or wired connection; and in some cases via one or more spectrum analyzers, e.g., as shown in FIG. 4, or the like) to communicate at least one of $f_O$, $f_C$, and/or $\Delta f$, so that downbanding by one device can match the upbanding by the other device. In yet another alternative embodiment, communication of at least one of $f_O$, $f_C$, and/or $\Delta f$ may be via data cables 180*a*-180*c*—e.g., preceding the combined signal, not unlike headers of data packets or headers for data routing, and/or the like. The downbanded POTS voice signal may then be transmitted to telephone 140.

The example above illustrates an inbound call combined with inbound data (i.e., data download and/or the like), but the various embodiments are not so limited. The same process may be applied to outbound calls and outbound data (i.e., data upload and/or the like). In such a case, the POTS voice signal from telephone 140 may be upbanded by the second interface device 170*b*, which may then be combined with data signal from the one or more user devices 130 via the one or more routers 125. The combined signal may be transmitted to the first interface device 170*a* via data cables 180*a*-180*c* and via the first and second outlets 175*a*, 175*b* from the second room 110*b* to the first room 110*a*. The first interface device 170*a* may then separate the combined signal. The data signal may be sent to network 145 via RG 120, NID 115*a* and/or ONT 115*b*, and sometimes via the one or more telecommunications relay system 150. The first interface device 170*a* may downband the upbanded POTS voice signal (in a manner similar to the downbanding process described above with respect to the second interface device 170*b*), and might send the downbanded POTS voice signal to the PSTN 155 via NID 115*a* and/or ONT 115*b*, via the telephone relay system 165, and via Class 5 Switch 160.

In various embodiments, the inbound and outbound signal processing may be performed concurrently. In other embodiments, the inbound and outbound signal processing may be performed sequentially. Although the above process is described as combining the POTS voice signal and the data signal over one wire (or one pair of wires) in the data cable, the process may be applied in a similar manner to combining the POTS voice signal and the data signal over two or more (separate or un-paired) wires (or two or more pairs of wires) in the data cable. In other cases, the process may be applied in a similar manner to combining the POTS voice signal and the data signal over all wires (or all pairs of wires) in the data cable.

According to some aspects, signal processing may be performed on the upbanded POTS voice signals to mitigate interference. In some cases, performing signal processing on the upbanded POTS voice signals for interference mitigation might comprise duplicating the upbanded POTS voice signals and transmitting the duplicated upbanded POTS voice signals over two or more wires in the data cable in the data network. In other cases, performing signal processing on the upbanded POTS voice signals for interference mitigation might comprise identifying a pair of wires in the data cable having the least interference level, and transmitting the upbanded POTS voice signals over the identified pair of wires in the cable. In alternative instances, signal processing might comprise implementing one or more of spread spectrum techniques (as described in detail below with respect to FIG. 6A), error correction techniques, or notch filtering techniques, and/or the like.

Figure 2A:
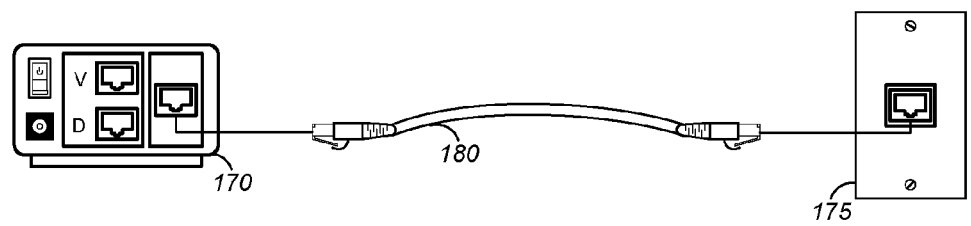
FIGS. 2A and 2B are general schematic diagrams illustrating various apparatuses for delivering POTS telephony over high speed data networks, in accordance with various embodiments.
Figure 2B:

FIGS. 2A and 2B (collectively, "FIG. 2") are general schematic diagrams illustrating various apparatuses for delivering POTS telephony over high speed data networks, in accordance with various embodiments. In FIG. 2A, interface device 170 might include input ports or jacks for each of the POTS voice signal cable and the data cable, and might further include an output port or jack for the combined signal (i.e., upbanded POTS voice signal combined with the data signal by the interface device 170). Data cable 180 might connect the output port or jack of the interface device 170 to the wall-mounted outlet 175 (i.e., port or jack of outlet 175).

In an alternative embodiment, interface device 170, as shown in FIG. 2B, might replace the output port or jack (and cable 180) of FIG. 2A with a connector similar to that of data cable 180. In this manner, interface device 170 might connect directly to the port or jack of outlet 175. In FIGS. 1 and 2, interface devices 170 are shown having a particular form factor; however, these are merely illustrative and the various embodiments are not so limited, and any suitable form factor may be implemented without deviating from the scope of the various embodiments.

Figure 3A:
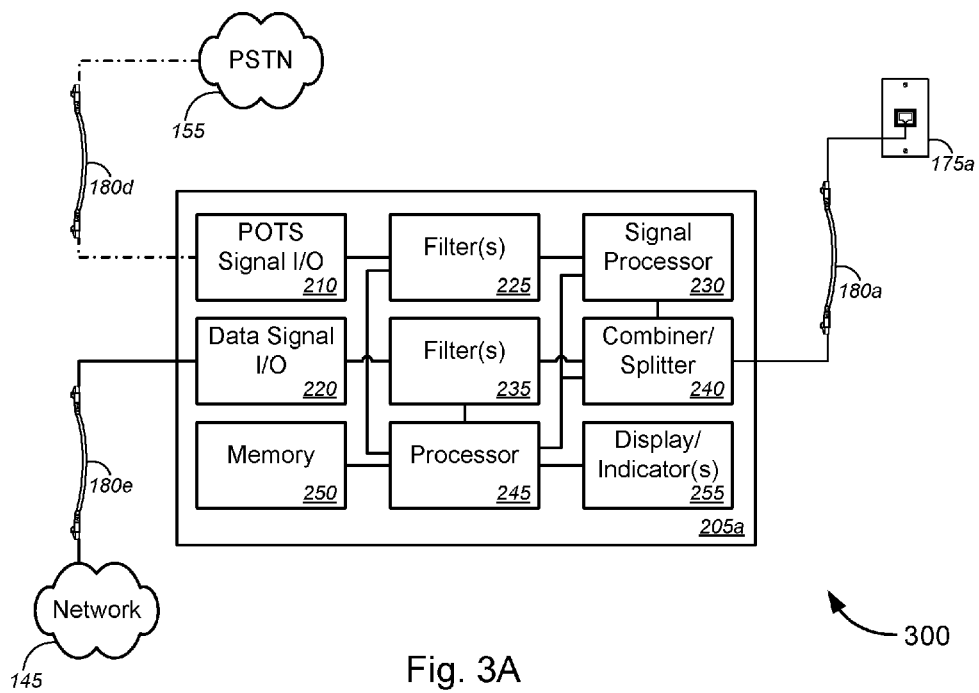
FIGS. 3A-3D are block diagrams illustrating various systems for delivering POTS telephony over high speed data networks, in accordance with various embodiments.
Figure 3B:
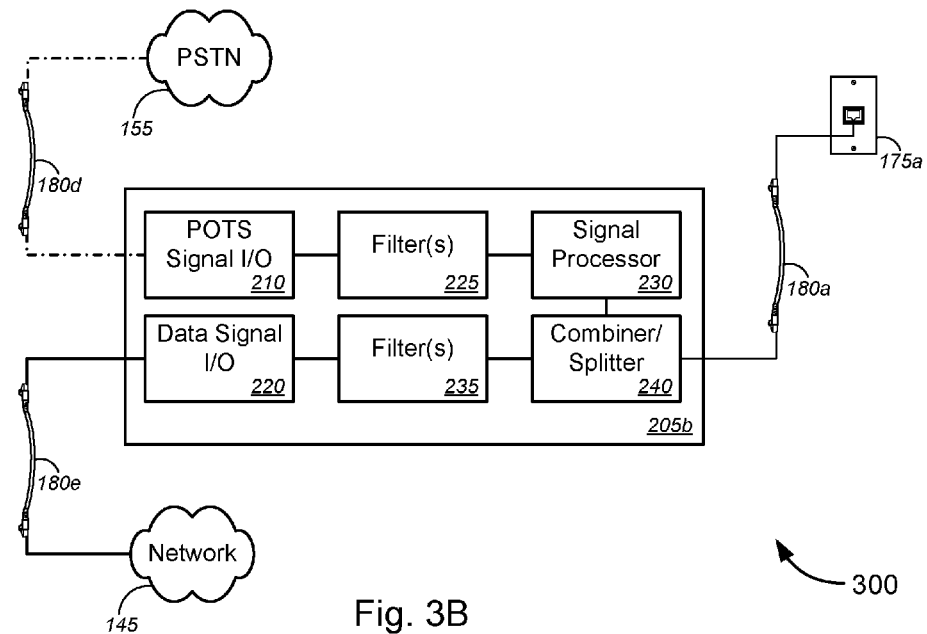
Figure 3C:
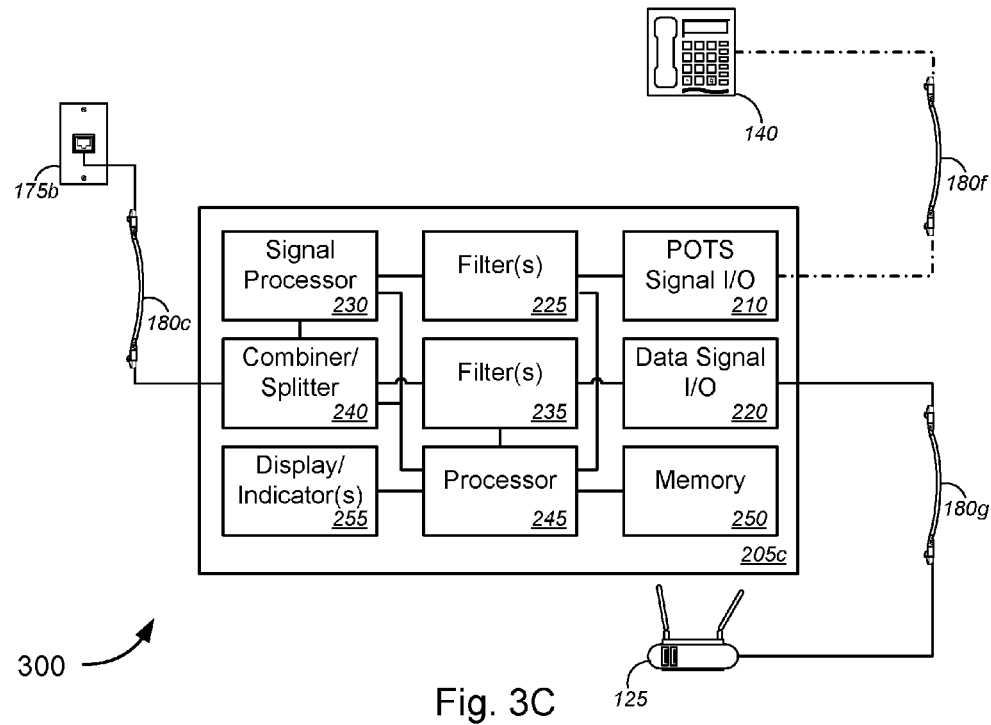
Figure 3D:
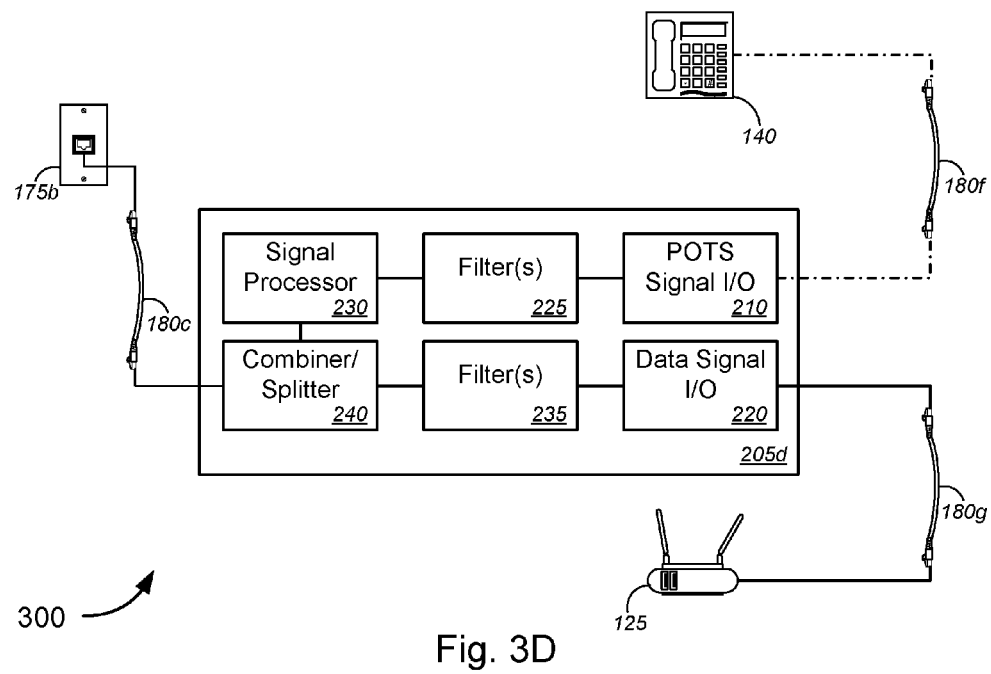

We now turn to FIGS. 3A-3D (collectively, "FIG. 3"), which are block diagrams illustrating various systems 300 for delivering POTS telephony over high speed data networks, in accordance with various embodiments. FIGS. 3A and 3B illustrate two embodiments for upbanding POTS voice signal from PSTN 155 and combining the upbanded POTS voice signal with data signal (downloaded) from network 145, or for separating combined signal from outlet 175a, sending data signal (i.e., uploading) to network 145, downbanding the POTS voice signal, and sending the downbanded POTS voice signal to PSTN 155. FIGS. 3C and 3D illustrate two corresponding embodiments for separating combined signal from outlet 175b, sending data signal to user devices via router 125, downbanding the POTS voice signal, and sending the downbanded POTS voice signal to telephone 140, or for upbanding POTS voice signal from telephone 140 and combining the upbanded POTS voice signal with data signal (uploaded) from user devices (e.g., user devices 130 in FIG. 1) via router 125.

With reference to FIG. 3A, a first interface device 205a might comprise POTS signal input/output ("I/O") device 210, data signal I/O device 220, filter(s) 225, signal processor 230, filter(s) 235, combiner/splitter 240, processor 245, memory 250, and/or display/indicator(s) 255. Combiner/splitter 240 might include, but is not limited to, a multiplexer/demultiplexer ("Mux/Demux"), and/or the like. Hereinafter, "combiner/splitter" might refer to a combiner, a splitter, or a combination device having functionalities of both a combiner and a splitter. POTS voice signals from PSTN 155 might be received by POTS signal I/O device 210 via voice/data cable 180d. The received POTS voice signal might be filtered by filter(s) 225, which might include one or more low pass filters and/or one or more band pass filters.

The filtered POTS voice signals may be signal processed by signal processor 230, which might include upbanding or rebanding the POTS voice signal to a center frequency $f_C$ above the threshold frequency $f_T$, as described in detail above with respect to FIG. 1. In some embodiments, signal processor 230 might further perform (on the upbanded POTS voice signal) one or more of duplicating the upbanded POTS voice signals and transmitting the duplicated upbanded POTS voice signals over two or more wires in the data cable in the data network; identifying a pair of wires in the data cable having the least interference level, and transmitting the upbanded POTS voice signals over the identified pair of wires in the cable; implementing spread spectrum techniques (as described in detail with respect to FIG. 6A); implementing error correction techniques; implementing notch filtering techniques; and/or the like.

Data signals from network 145 might be received by data signal I/O device 220 via data cable 180e. The received data signals might be filtered by filter(s) 235, which might include one or more low pass filters and/or one or more band pass filters. The filtered data signals may subsequently be combined with the upbanded (and, in some cases, signal processed) POTS voice signal by combiner 240. The combined signal might be transmitted to outlet 175a via data cable 180a (on the same wire(s) of data cable 180a). According to some embodiments, processor 245 might be configured to control the filtering of the filter(s) 225 and/or filter(s) 235, e.g., by setting frequency ranges, pass bands, and frequency values, etc., for filter(s) 225 and/or filter(s) 235 (in the case that filter(s) 225 and/or filter(s) 235 are variable or adjustable filters, and/or the like). In some cases, the frequencies of the data signal (e.g., at data signal I/O device 220) might be monitored for noise to identify an appropriate spectrum to which to upband the POTS voice signals. In some instances, this might include monitoring frequencies above the frequency threshold ($f_T$) to identify a center frequency ($f_C$) at which a minimal amount of signal is detected. The processor 245 might instruct the signal processor 230 to upband the filtered POTS voice signal such that the filtered POTS voice signal is centered about the center frequency ($f_C$). Memory 250 might store user preferences for the upbanding/downbanding of the POTS voice signal, values for at least one of $f_O$, $f_C$, and/or $\Delta f$, previous settings for filtering the POTS and/or data signals, previous settings for the signal processor, previous settings for the combiner/splitter 240, previous settings for display/indicator(s) 255, and/or the like. Display/indicator(s) 255 might indicate when the first interface device 205a is powered, and in some cases, might indicate upload states, download states, upbanding status, downbanding status, and/or the like.

In the outbound and uploading state, a combined signal might be received by splitter 240 from outlet 175a via data cable 180a. The splitter 240 might split or separate the POTS voice signal from the data signal (for each wire or wire pair of data cable 180a). The POTS voice signal might be signal processed and/or downbanded by signal processor 230, and subsequently filtered by filter(s) 225, and output to PSTN 155 via data cable 180d and POTS signal I/O device 210. The data signal separated by splitter 240 might be filtered by filter(s) 235 and output to network 145 via data cable 180e and data signal I/O device 220.

Referring to FIG. 3B, another embodiment of interface device 205 is shown. A second interface device 205b (shown in FIG. 3B) might comprise POTS signal I/O device 210, data signal I/O device 220, filter(s) 225, signal processor 230, filter(s) 235, and/or combiner/splitter 240 (which might include, but is not limited to a Mux/Demux, and/or the like), without comprising processor 245, memory 250, and display/indicator(s) 255. In other words, the second interface device 205b of FIG. 3B might be similar or identical to the first interface device 205a of FIG. 3A, except without processor 245, memory 250, and display/indicator(s) 255. As such, filter(s) 225 and filter(s) 235 might be passive filters, and/or the like. The second interface device 205b of FIG. 3B might otherwise function in a similar manner as described above with respect to the first interface device 205a of FIG. 3A.

Turning to FIG. 3C, a third interface device 205c device similar, or identical to, the first interface device 205a might be provided. Here, the third interface device 205c, in the inbound or download state, might receive, at splitter 240, the combined signal from outlet 175b via data cable 180c. In a manner similar to the outbound and uploading state as described above with respect to FIG. 3A and interface device 205a, the splitter 240 of the third interface device 205c might split or separate the POTS voice signal from the data signal (for each wire or wire pair of data cable 180c). The POTS voice signal might be signal processed and/or downbanded by signal processor 230, and subsequently filtered by filter(s) 225, and output to telephone 140 via voice/data cable 180f and POTS signal I/O device 210. The data signal separated by splitter 240 might be filtered by filter(s) 235 and output to router 125 (and subsequently to the one or more user devices 130 shown in FIG. 1) via data cable 180g and data signal I/O device 220.

In the outbound and uploading state, the third interface device 205c might function in a similar manner as the first interface device 205a in the inbound and downloading state. In particular, POTS voice signals from telephone 140 might be received by POTS signal I/O device 210 via voice/data cable 180f. The received POTS voice signal might be filtered by filter(s) 225, which might include one or more low pass filters and/or one or more band pass filters. The filtered POTS voice signals may be signal processed by signal processor 230, which might include upbanding or rebanding the POTS voice signal to a center frequency $f_C$ above the threshold frequency $f_T$, as described in detail above with respect to FIG. 1 and FIG. 3A. In some embodiments, signal processor 230 might further perform (on the upbanded POTS voice signal) one or more of duplicating the upbanded POTS voice signals and transmitting the duplicated upbanded POTS voice signals over two or more wires in the data cable in the data network; identifying a pair of wires in the data cable having the least interference level, and transmitting the upbanded POTS voice signals over the identified pair of wires in the cable; implementing spread spectrum techniques (as described in detail with respect to FIG. 6A); implementing error correction techniques; implementing notch filtering techniques; and/or the like. Data signals from router 125 might be received by data signal I/O device 220 via data cable 180g. The received data signals might be filtered by filter(s) 235, which might include one or more low pass filters and/or one or more band pass filters. The filtered data signals may subsequently be combined with the upbanded (and, in some cases, signal processed) POTS voice signal by combiner 240. The combined signal might be transmitted to outlet 175b via data cable 180c (on the same wire(s) of data cable 180c).

The processor 245, memory 250, and the display/indicator(s) 255 of the third interface device 205c of FIG. 3C might function in a similar, or identical, manner as the corresponding components in the first interface device 205a (as shown and described above with respect to FIG. 3A).

In FIG. 3D, the fourth interface device 205d might function in a similar, or identical, manner as the third interface device 205c (shown in FIG. 3C), except without functionalities of processor 245, memory 250, and display/indicator(s) 255. In particular, the fourth interface device 205d (shown in FIG. 3D) might comprise POTS signal I/O device 210, data signal I/O device 220, filter(s) 225, signal processor 230, filter(s) 235, and/or combiner/splitter 240 (which might include, but is not limited to a Mux/Demux, and/or the like), without comprising processor 245, memory 250, and display/indicator(s) 255. As such, filter(s) 225 and filter(s) 235 might be passive filters, and/or the like.

Figure 4A:
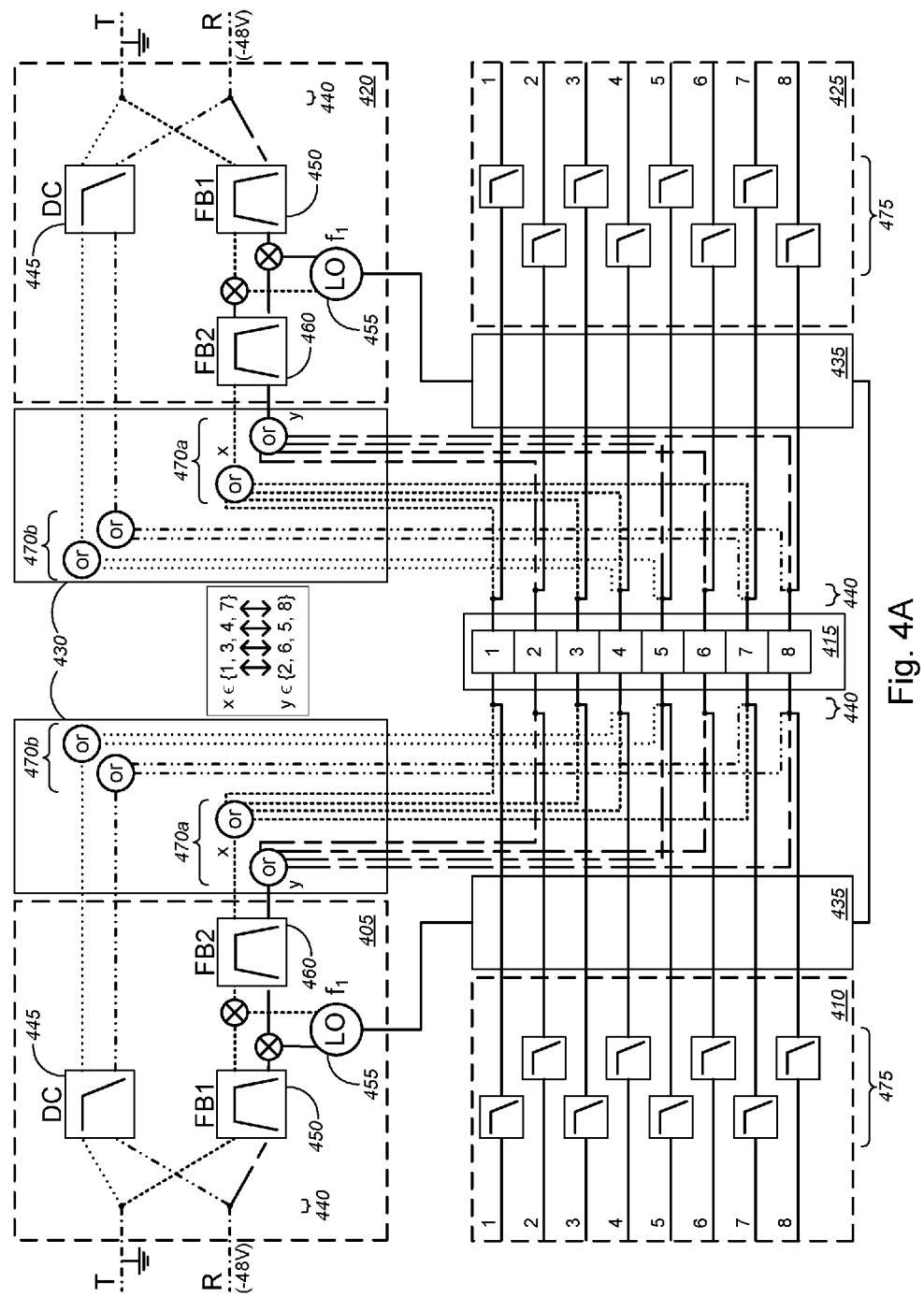
FIGS. 4A and 4B are general schematic diagrams illustrating another system for delivering POTS telephony over high speed data networks, in accordance with various embodiments.
Figure 4B:
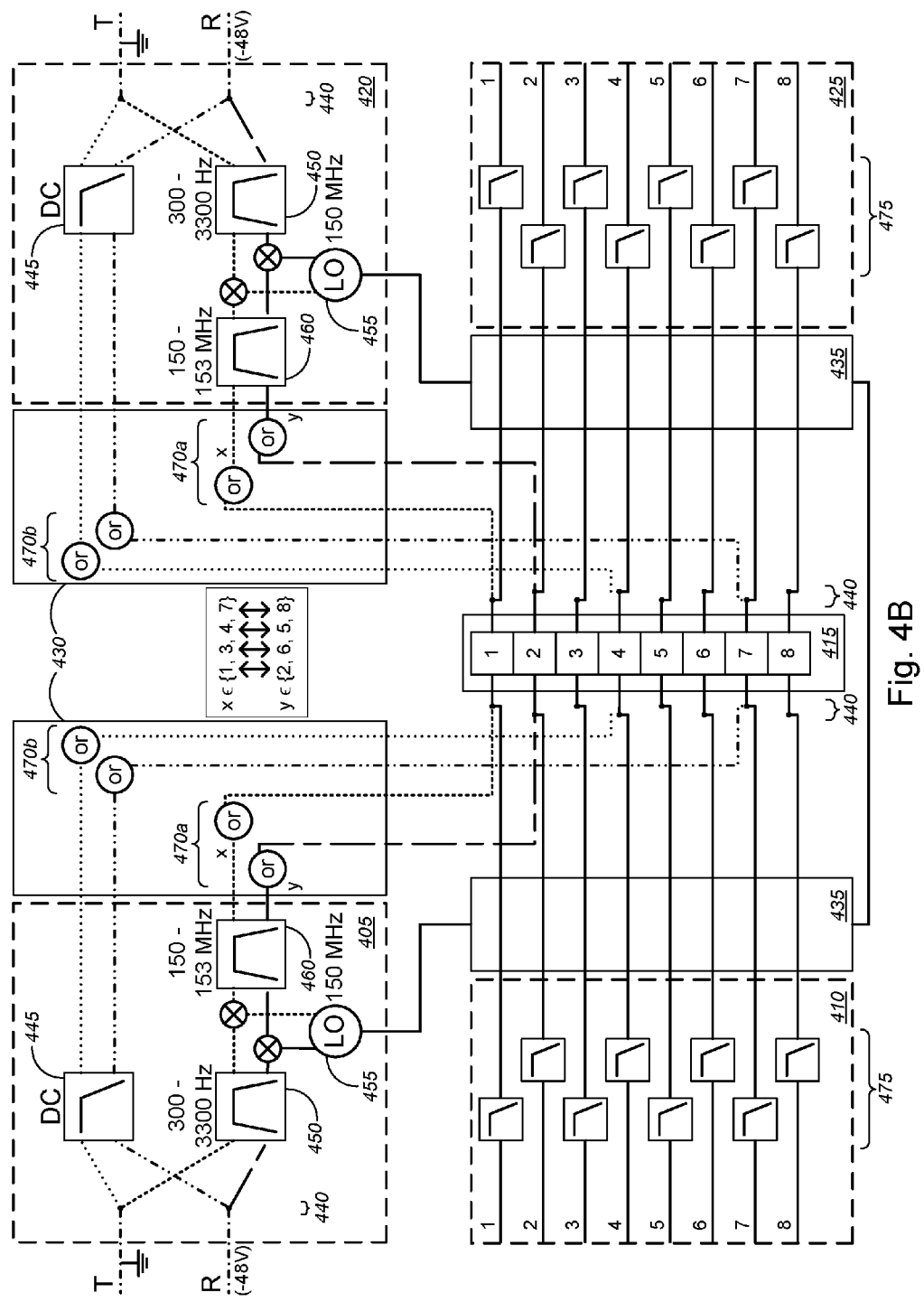

FIGS. 4A and 4B (collectively, "FIG. 4") are general schematic diagrams illustrating another system for delivering POTS telephony over high speed data networks, in accordance with various embodiments. FIG. 4A illustrates a generic system diagram, while FIG. 4B shows a system diagram for a specific (and non-limiting) example implementation.

In FIG. 4A, the system might comprise a first interface device 405, a first data transmission medium 410, a data cable 415, a second interface device 420, a second data transmission medium 425, one or more signal processors 430, one or more spectrum analyzers 435, and/or a plurality of combiners/splitters 440 (which might include, without limitation, multiplexers/demultiplexers, and/or the like). Each of the first interface device 405 and the second interface device 420 might comprise combiners or splitters 440 that split POTS voice signal from each of the signal components of the tip (at ground potential or 0V) and ring (at −48V) of a voice transmission cable to each of a direct current ("DC") path and an alternating current ("AC") path. The DC path might comprise a low-pass filter 445, while the AC path might comprise a first band pass filter 450, a local oscillator 455, and a second band pass filter 460. Signal processors 430 might comprise one or more signal distribution devices 470, which might include, without limitation, OR gates, AND gates, combiners/splitters, multiplexer/demultiplexers, and/or the like. Each of the first and second data transmission media 410 and 425 might connect or interface with a data cable (e.g., data cable 180 in FIGS. 1-3). In some instances, each of the first data transmission medium 410 and the second data transmission medium 425 might further comprise a plurality of filters 475 (including, without limitation, low pass filters, and/or the like), each corresponding to one of the wires in the data cable (which might include, but is not limited to, a Cat 5, Cat 5e, Cat 6, Cat 6a, Cat 7, Cat 7a, or any other suitable data cable). In the example of FIG. 4, the 8 pins/wires of a Cat 5, Cat 5e, Cat 6, Cat 6a, Cat 7, or Cat 7a are shown. Output from the AC path of the interface devices 405, 420 are two paths x and y, where x can include one or more of pins/wires 1, 3, 4, and/or 7 of the data cable, while y can include one or more of pins/wires 2, 6, 5, and/or 8 of the data cable.

According to some embodiments, the functionalities of each of the first/second interface device 405/420, the first/second data transmission medium 410/425, one of the one or more signal processors 430, one of the one or more spectrum analyzers 435, and/or some of the plurality of combiners/splitters 440 (particularly the combiners/splitters on either side of the data cable 415 in FIG. 4) might be embodied in each (or one or more) of the interface devices 170 and 205 in FIGS. 1-3.

FIG. 4B illustrates operation of the system shown in FIG. 4A using a non-limiting set of example values. With reference to FIG. 4B, a non-limiting example implementation is provided to facilitate better understanding of the operation of the system of FIG. 4. In the example of FIG. 4B, the POTS voice signal might be transmitted over the tip and ring components of the voice transmission cable, and received by the first interface device 405. Part of each of the tip and ring signals is split by combiner/splitter 440, and filtered by filter 445 (which in the example of FIG. 4 is a low pass filter; although the various embodiments are not so limited). The tip component after filtering by filter 445 is processed by signal processor 430 and combined by combiner 440 with data signal in pin/wire 4 of data cable 415 (as shown by the dotted line). The ring component after filtering by filter 445 is processed by signal processor 430 and combined by combiner 440 with data signal in pin/wire 7 of data cable 415 (as shown by the dot-dot-dash line). At the same time, part of each of the tip and ring components might be filtered by the first band pass filter 450, which has a pass band between 300 and 3300 Hz. Although the pass band is shown in FIG. 4B as having a bandwidth of 3 kHz (i.e., having a pass band between 300 and 3300 Hz in the figure), the various embodiments are not so limited, and the bandwidth of the first band pass filter 450 can be any suitable bandwidth between 3 kHz and 5 MHz, and in some cases can be 10 or 20 MHz, or the like (e.g., for spread spectrum applications, and/or the like). The filtered components (which would be in the frequency range between 300 and 3300 Hz) might be rebanded or upbanded by local oscillator 455 either by a static frequency shift ($\Delta f$) of 150 MHz (which is above the threshold frequency $f_T$) for 1 Gbps Ethernet, or by a dynamic frequency shift ($\Delta f$) based at least in part on monitoring of the frequencies in the data signal lines by the spectrum analyzer 435. In the case of 10 Gbps Ethernet, the static frequency shift ($\Delta f$) might be set to be greater than the $f_T$ of 250 MHz. Likewise, for Ethernet utilizing a Cat 7 cable, the static frequency shift ($\Delta f$) might be set to be greater than the $f_T$ of 600 MHz (for 10 Gbps Ethernet), while for Ethernet utilizing a Cat 7a cable, the static frequency shift ($\Delta f$) might be set to be greater than the $f_T$ of 1000 MHz (for 100 Gbps Ethernet).

The upbanded POTS signal might subsequently be filtered by the second band pass filter 460 (which has a pass band between 150 and 153 MHz for 1 Gbps Ethernet, but would be higher to correspond to the higher frequency shifts ($\Delta f$) for 10 and 100 Gbps Ethernet). Although the second band pass filter 460 is shown in FIG. 4B as having a bandwidth of 3 MHz (i.e., having a pass band between 150 and 153 MHz in the figure), the various embodiments are not so limited, and the bandwidth of the second band pass filter 460 can be any suitable bandwidth between 3 kHz and 5 MHz, and in some cases can be 10 or 20 MHz, or the like (e.g., for spread spectrum applications, and/or the like). In operation, the local oscillator 455 might effectively produce two frequency signals for each input signal. Take for example, the low end frequency of 300 Hz. When upbanded by the local oscillator 455 by a frequency shift of 150 MHz, a 150,000,300 Hz signal and a 149,999,700 Hz signal might result. The second band pass filter 460 might filter out the lower frequency signal, resulting in only the 150,000,300 Hz (herein referred to as "first end frequency") signal being output and signal processed by signal processor 430. At the high end frequency of 3300 Hz, when upbanded by the local oscillator by a frequency shift of 150 MHz, a 150,003,300 Hz signal and a 149,996,700 Hz signal might result. The second band pass filter 460 might filter out the lower frequency signal, resulting in only the 150,003,300 Hz (herein referred to as "second end frequency") signal being output and signal processed by signal processor 430. Of course, the actual POTS signal (after being upbanded and filtered by the first interface device 405) would range between 150,000,300 and 150,003,300 Hz. The tip component after being filtered and upbanded is processed by signal processor 430 and combined by combiner 440 with data signal in pin/wire 1 of data cable 415 (as shown by the dash line). The ring component after being filtered and upbanded is processed by signal processor 430 and combined by combiner 440 with data signal in pin/wire 2 of data cable 415 (as shown by the dash-long dash line).

After transmission through data cable 415 (which might be an in-wall cable, such as data cable 180b shown in FIG. 1), the combined signal might be separated by splitter 440, where the data signal would continue through the second data transmission medium 425, while the upbanded POTS signal might be processed through signal processor 430 and the second interface device 420. In particular, the DC component of the POTS signal in pins/wires 4 and 7 might be filtered by filter 445 and sent to the corresponding tip and ring wires of the telephone cable. The 150,000,300 to 150,003,300 Hz upbanded POTS signal might be downbanded by local oscillator 455 by the same frequency shift ($\Delta f$) (i.e., either the static frequency shift (in this case, 150 MHz for 1 Gbps Ethernet) or by the dynamic frequency shift based at least in part on monitoring by the spectrum analyzer 435). In this example, for the first end frequency of 150,000,300 Hz, when downbanded by the local oscillator 455 by a frequency shift of 150 MHz, a 300 Hz signal and a 300,000,300 Hz signal might result. The first band pass filter 450 might filter out the higher frequency signal, resulting in only the 300 Hz signal being output to tip and ring. At the second end frequency of 150,003,300 Hz, when downbanded by the local oscillator 455 by a frequency shift of 150 MHz, a 3300 Hz signal and a 300,003,300 Hz signal might result. The first band pass filter 450 might filter out the higher frequency signal, resulting in only the 3300 Hz signal being output to tip and ring. Of course, the actual (output, inbound) POTS signal would range between the 300-3300 Hz.

In the second interface device 420, the second band pass filter 460 might be redundant when downbanding an already upbanded POTS signal, but when transmitted in the opposite direction (i.e., in the outbound direction, compared with the inbound situation described above), the second band pass filter 460 serves to filter out the higher frequency signal after upbanding. In other words, in the outbound direction, due to the mirrored arrangement of the interface devices 405 and 420 (as well as of the other components in FIG. 4), the process would be identical, only differing in the direction of transmission and signal processing. As such, the description of the upbanding (and other processes) by the first interface device 405, signal processing by the signal processor 430, combination by combiner 440, transmission over data cable 415, separation by splitter 440, signal processing by signal processor 430, and downbanding (and other processes) by the second interface device 420 may be applied to upbanding (and other processes) by the second interface device 420, signal processing by the signal processor 430, combination by combiner 440, transmission over data cable 415, separation by splitter 440, signal processing by signal processor 430, and downbanding (and other processes) by the first interface device 405.

In FIG. 4, the spectrum analyzers 435 at either end of the data cable 415 are shown to be linked either wirelessly or via wired connection. Alternatively, or in addition, the local oscillator 455 in each of the first and second interface devices 405 and 420 might be communicatively coupled (either wirelessly or via wired connection), as described above with respect to FIG. 1.

FIGS. 5A-5C (collectively, "FIG. 5") are graphical illustrations showing combination of POTS telephony signals and data signals for concurrent transmission over the same wire(s) of a high speed data cable, in accordance with various embodiments. FIG. 5A shows a graphical illustration of an example data signal 505, plotted with signal amplitude versus frequency. With reference to FIG. 5A, a threshold frequency ($f_T$) might refer to a frequency above which signal amplitude of the data signal might be low or zero, so as not to interfere with another signal (e.g., a POTS voice signal) that one might overlay with the data signals. In the case of 1 Gbps Ethernet, for instance, the threshold frequency ($f_T$) might be 100 MHz, while for 10 Gbps Ethernet, the $f_T$ might be 250 MHz. For Ethernet utilizing a Cat 7 cable, $f_T$ might be 600 MHz (for 10 Gbps Ethernet), while for Ethernet utilizing a Cat 7a cable, $f_T$ might be 1000 MHz (for 100 Gbps Ethernet).

FIG. 5B shows a graphical illustration of an example POTS voice signal 510 having a first bandwidth ("BW," which might be, but is not limited to, 3 kHz, for example), which might be centered about an original center frequency ($f_O$). The POTS voice signal 510 may be upbanded to a higher frequency to become the upbanded POTS voice signal 515, via upbanding processes described herein and illustrated by arrow 520, in accordance with various embodiments. Herein, the upbanded POTS voice signal 515 might be upbanded by a frequency shift ($\Delta f$) from the original center frequency ($f_O$), so as to have a center frequency ($f_C$) that is above the threshold frequency ($f_T$).

The upbanded POTS voice signal 515 may be combined with the data signal 505 over the same wire of a data cable, as represented by arrows 525, to form a combined voice/data signal, e.g., as shown in FIG. 5C.

Figure 6A:
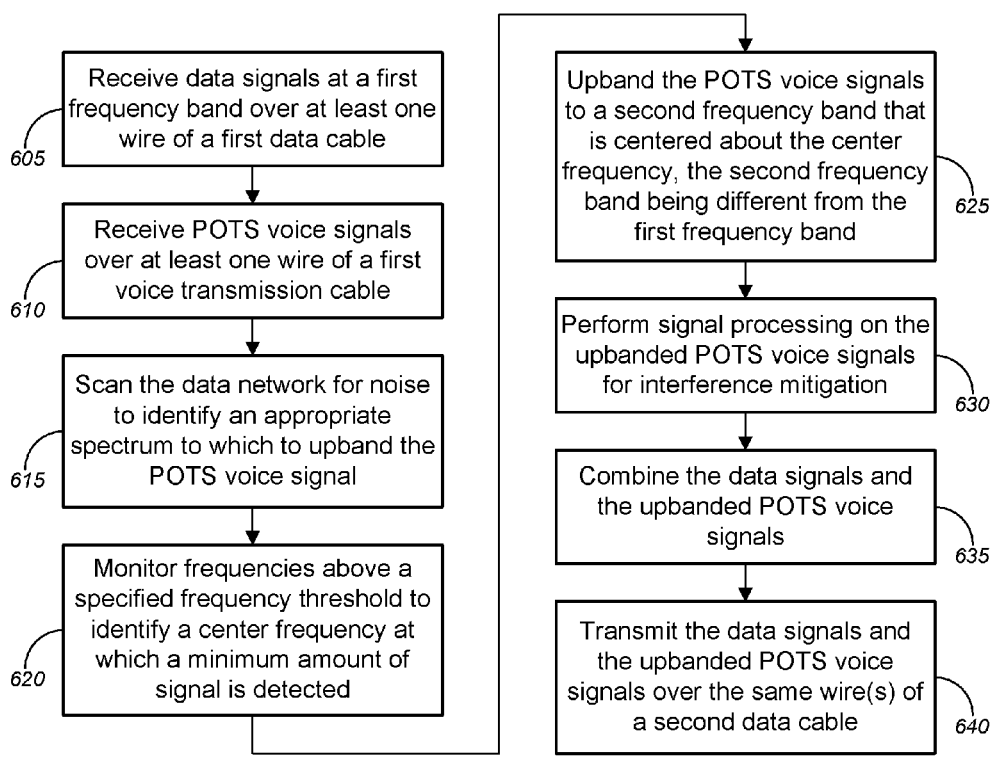
FIGS. 6A and 6B are flow diagrams illustrating a method for delivering POTS telephony over high speed data networks, in accordance with various embodiments.
Figure 6B:
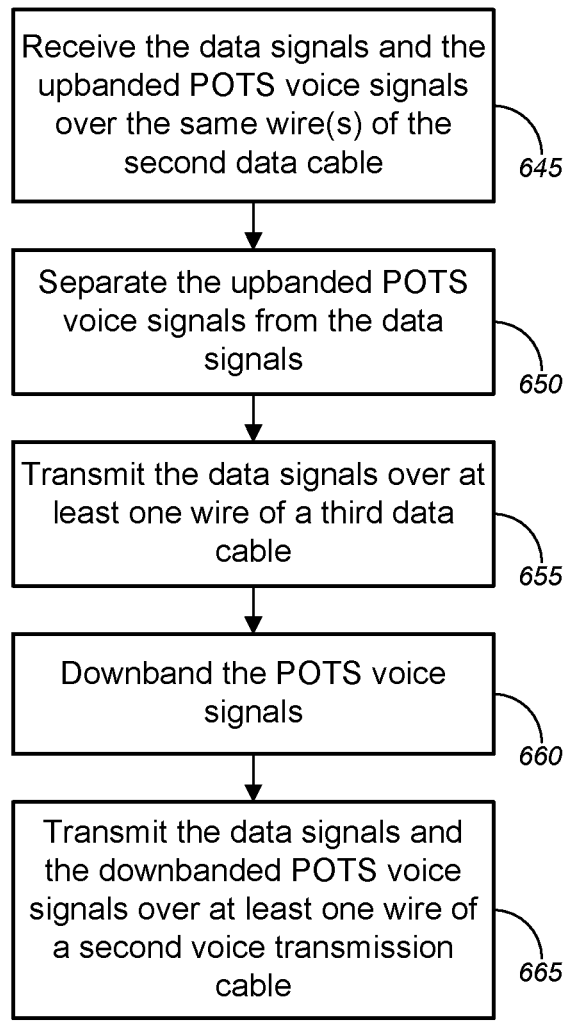

FIGS. 6A and 6B (collectively, "FIG. 6") are flow diagrams illustrating a method 600 for delivering plain old telephone service ("POTS") telephony over high speed data networks, in accordance with various embodiments. In particular, FIG. 6A is a flow diagram illustrating a method 600 for receiving, combining, and transmitting POTS voice signals and data signals over the same wire(s) of a data cable, at one end. FIG. 6B is a flow diagram illustrating method 600 for receiving the combined POTS voice signals/data signals over the same wire(s) of the data cable, separating the POTS voice signals from the data signals, and transmitting the POTS voice signals over separate cables from the data signals, at the other end.

In FIG. 6A, method 600 might comprise, at block 605, receiving data signals at a first frequency band over at least one wire of a first data cable. For 1 Gbps Ethernet, for example, the first frequency band might be between 0 and 100 MHz. For 10 Gbps Ethernet, the first frequency band might be between 0 and 250 MHz. To achieve speeds of 1 Gbps or greater in a LAN, all four wire pairs (i.e., 8 wires) of a typical data cable (including, without limitation, one or more of Category 5 ("Cat 5") twisted pair cable, Enhanced Category 5 ("Cat 5e") twisted pair cable, Category 6 ("Cat 6") twisted pair cable, Augmented Category 6 ("Cat 6a") twisted pair cable, Category 7 ("Cat 7") twisted pair cable, and/or Augmented Category 7 ("Cat 7a") twisted pair cable, and/or the like) may be utilized for transmitting the data signal. As such, no spare wires in the cable are available for transmitting POTS voice signals, unlike Mbps Ethernet, in which wires or wire pairs in the data cable that are not already utilized for transmitting data signals may be utilized for transmitting POTS voice signals.

At block 610, method 600 might comprise receiving POTS voice signals over at least one wire of a first voice transmission cable, which may include any suitable telephone cable, including, without limitation, one or more of traditional telephone cables (having RJ11, RJ14, or other similar connectors for corresponding ports, etc.), Cat 5, Cat 5e, Cat 6, Cat 6a, Cat 7, and/or Cat 7a cables, and the like.

Method 600, at block 615, might comprise scanning the data network (or wires of the data cable) to identify an appropriate spectrum to which to upband the POTS voice signal. In some embodiments, identifying an appropriate spectrum might include, without limitation, monitoring frequencies above a specified frequency threshold to identify a center frequency at which a minimum amount of signal is detected (block 620). In some cases, the process of block 620 may be performed once, while in other cases, it may be continually performed or performed at predetermined intervals (including, but not limited to, intervals of 1, 2, 3, 4, 5, 10, 15, 30, or 60 seconds, or 1, 2, 3, 4, 5, 10, 15, 30, or 60 minutes, 1, 2, 3, 4, 5, 6, 12, 18, or 24 hours, 1, 2, 3, 4, or 5 days, 1, 2, 3, or 4 weeks, and/or 1, 2, 3, 4, 5, 6, or 12 months, and/or combinations thereof, etc., or ranges of intervals of 1-60 seconds, 1-60 minutes, 1-24 hours, 1-365 days, 1-52 weeks, 1-12 months, or 1-5 years, and/or combinations thereof, etc.). In the case of 1 Gbps Ethernet, for instance, the specified frequency threshold might be 100 MHz, while for 10 Gbps Ethernet, the specified frequency threshold might be 250 MHz, or 600 MHz for 100 Gbps Ethernet. For Ethernet utilizing a Cat 7 cable, $f_T$ might be 600 MHz (for 10 Gbps Ethernet), while for Ethernet utilizing a Cat 7a cable, $f_T$ might be 1000 MHz (for 100 Gbps Ethernet). At block 625, method 600 might comprise upbanding the POTS voice signals to a second frequency band that is centered about the center frequency (e.g., center frequency ($f_c$) as shown and described with respect to FIG. 5), the second frequency band being different from the first frequency band.

Method 600, at block 630, might comprise performing signal processing on the upbanded POTS voice signals for interference mitigation. In some instances, such signal processing might include duplicating the upbanded POTS voice signals and transmitting the duplicated upbanded POTS voice signals over two or more wires (or over two or more pairs of wires) in the data cable in the data network. In some cases, such signal processing might include identifying a pair of wires in the data cable having the least interference level, and transmitting the upbanded POTS voice signals over the identified pair of wires in the cable. In other cases, such signal processing might comprise implementing one or more of spread spectrum techniques, error correction techniques, and/or notch filtering techniques, as understood in the art. Taking spread spectrum techniques, for example, a typical 3 kHz bandwidth ("BW") POTS voice signal (which in the case above has been centered about center frequency ($f_c$), for instance) might be signal processed so as to spread over a wider frequency spectrum, to have a BW of 5 MHz, 10 MHz, or 20 MHz, or any BW ranging from 3 KHz to 20 MHz, and/or the like. Spreading the spectrum in this manner allows for redundancy and recovery of signal even in high interference or high bit error rate ("BER") situations.

At block 635, method 600 might comprise combining the data signals and the upbanded POTS voice signals, and transmitting the data signals and the upbanded POTS voice signals over the same wire(s) of a second data cable (block 640). The combining process might, in some cases, involve implementing appropriate combining techniques, multiplexing techniques, and/or the like (e.g., as shown in FIG. 4).

FIG. 5, for example, shows how the center frequency ($f_c$) might be identified, as well as, upbanding the POTS voice signals to be centered about the center frequency ($f_c$), and combining the upbanded POTS voice signals with the data spectrum/signals. The second data cable might, in some embodiments, include a data cable that is (or has been) wired within the walls of a customer premises (e.g., Cat 5 cable wired within walls of a brownfield, or the like; or one or more of Cat 5, Cat 5e, Cat 6, Cat 6a, Cat 7, and/or Cat 7a cables wired in the walls of customer residential buildings or customer business buildings, etc.).

With reference to FIG. 6B, after the combined signals have been transmitted over the second data cable in the walls of customer premises (i.e., from one room to another room), the signals must be extracted and fed to the corresponding user devices or to the corresponding network (i.e., POTS network for the POTS voice signals and data network for the data signals). To that end, method 600 might comprise receiving the combined data signals and upbanded POTS voice signals over the same wire(s) of the second data cable (block 645), and separating the upbanded POTS voice signals from the data signals (block 650). The separating process might involve, in some instances, applying appropriate filtering techniques and separating techniques (e.g., splitting or demultiplexing techniques, or the like), and/or the like (e.g., as shown in FIG. 4).

At block 655, method 600 might comprise transmitting the data signals over at least one wire of a third data cable (e.g., one or more of Cat 5, Cat 5e, Cat 6, Cat 6a, Cat 7, and/or Cat 7a cables, and/or the like). Method 600 might comprise, at block 660, downbanding the POTS voice signals, and, at block 665, transmitting the data signals and the downbanded POTS voice signals over at least one wire of a second voice data cable.

In some cases, one of the first data cable or the third data cable might connect directly to one or more user devices or indirectly to the one or more user devices via a wireless access point. The one or more user devices might include, without limitation, one or more of a gaming console, a digital video recording and playback device ("DVR"), a set-top or set-back box ("STB"), one or more television sets ("TVs"), a desktop computer, a laptop computer, tablet computers, one or more smart phones, one or more mobile phones, or one or more portable gaming devices, and/or the like). The other of the first data cable or the third cable might connect directly or indirectly (in a wired or wireless manner) to a data network, including, but not limited to, a local area network ("LAN"), including without limitation a fiber network, an Ethernet network, a Token-Ring™ network, and the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol, or any other wireless protocol.

Figure 7:
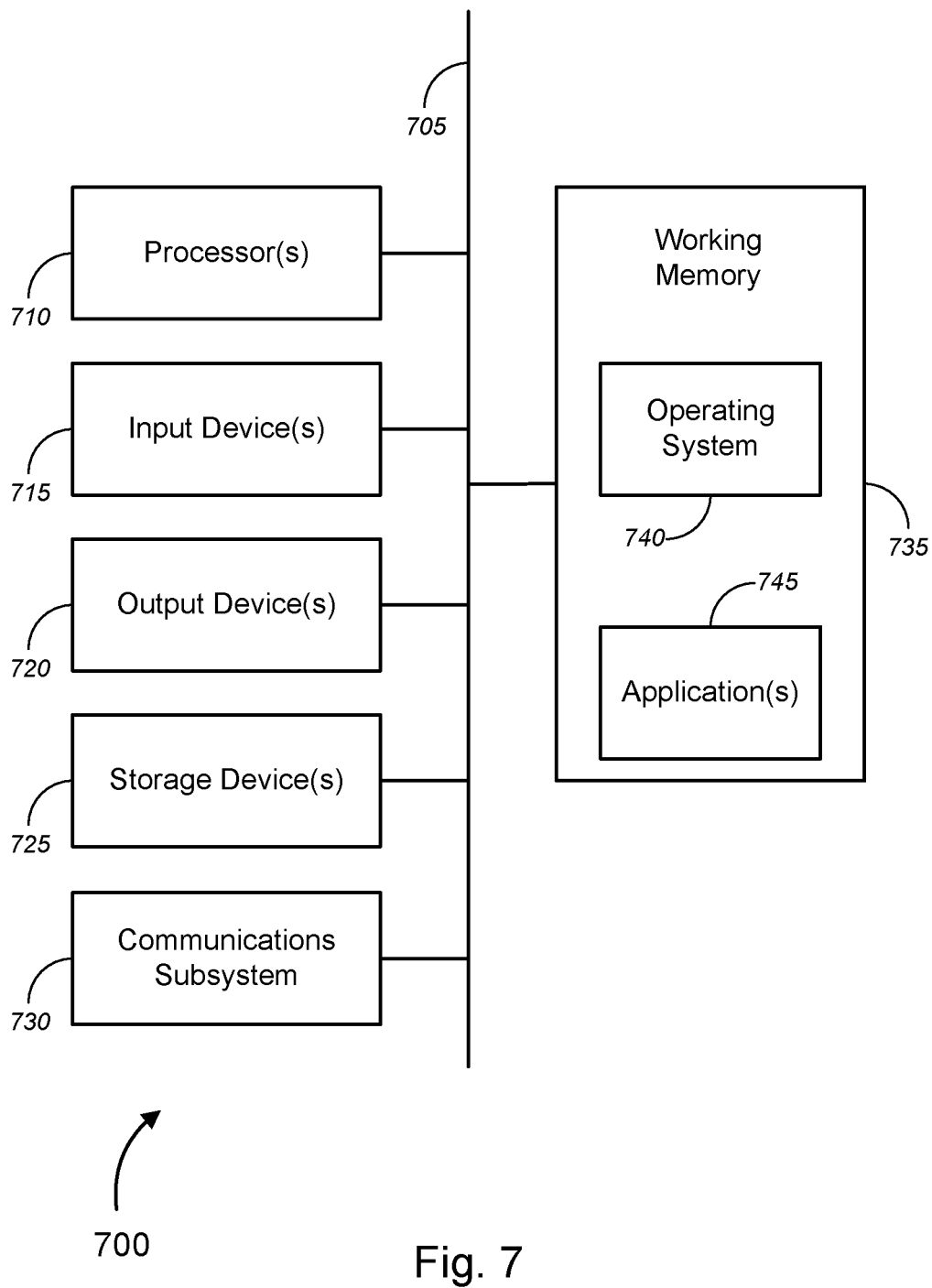
FIG. 7 is a block diagram illustrating an exemplary computer or system hardware architecture, in accordance with various embodiments.

We now turn to FIG. 7, which is a block diagram illustrating an exemplary computer architecture. FIG. 7 provides a schematic illustration of one embodiment of a computer system 700 that can perform the methods provided by various other embodiments, as described herein, and/or can perform the functions of POTS/data processing devices 170, 205, 405, or 420, local or user computing systems 130, user devices 135 or 140, or other computer systems as described above. It should be noted that FIG. 7 is meant only to provide a generalized illustration of various components, of which one or more, or none, of each may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705, or may otherwise be in communication, as appropriate. The hardware elements may include one or more processors 710, including without limitation one or more general-purpose processors, or one or more special-purpose processors such as digital signal processing chips, graphics acceleration processors, or the like; one or more input devices 715, which can include without limitation a mouse, a keyboard, or the like; and one or more output devices 720, which can include without limitation a display device, a printer, or the like.

The computer system 700 may further include, or be in communication with, one or more storage devices 725. The one or more storage devices 725 can comprise, without limitation, local and/or network accessible storage, or can include, without limitation, a disk drive, a drive array, an optical storage device, a solid-state storage device, or the like. The solid-state storage device can include, but is not limited to, one or more of a random access memory ("RAM") or a read-only memory ("ROM"), which can be programmable, flash-updateable, or the like. Such storage devices may be configured to implement any appropriate data stores, including without limitation various file systems, database structures, or the like.

The computer system 700 might also include a communications subsystem 730, which can include without limitation a modem, a network card (wireless or wired), an infra-red communication device, a wireless communication device or chipset, or the like. The wireless communication device might include, but is not limited to, a Bluetooth™ device, an 802.11 device, a WiFi device, a WiMax device, a WWAN device, cellular communication facilities, or the like.

The communications subsystem 730 may permit data to be exchanged with a network (such as network 145 or 155, to name examples), with other computer systems, with any other devices described herein, or with any combination of network, systems, and devices. According to some embodiments, network 145 (as well as network 155) might include a local area network ("LAN"), including without limitation a fiber network, an Ethernet network, a Token-Ring™ network, and the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol, or any other wireless protocol; or any combination of these or other networks. In many embodiments, the computer system 700 will further comprise a working memory 735, which can include a RAM or ROM device, as described above.

The computer system 700 may also comprise software elements, shown as being currently located within the working memory 735, including an operating system 740, device drivers, executable libraries, or other code. The software elements may include one or more application programs 745, which may comprise computer programs provided by various embodiments, or may be designed to implement methods and/or configure systems provided by other embodiments, as described herein. Merely by way of example, one or more procedures described with respect to the methods discussed above might be implemented as code or instructions executable by a computer or by a processor within a computer. In an aspect, such code or instructions can be used to configure or adapt a general purpose computer, or other device, to perform one or more operations in accordance with the described methods.

A set of these instructions or code might be encoded and/or stored on a non-transitory computer readable storage medium, such as the storage devices 725 described above. In some cases, the storage medium might be incorporated within a computer system, such as the system 700. In other embodiments, the storage medium might be separate from a computer system—that is, a removable medium, such as a compact disc, or the like. In some embodiments, the storage medium might be provided in an installation package, such that the storage medium can be used to program, configure, and/or adapt a general purpose computer with the instructions/code stored thereon. These instructions might take the form of executable code, which is executable by the computer system 700, or might take the form of source or installable code. The source or installable code, upon compilation, installation, or both compilation and installation, on the computer system 700 might take the form of executable code. Compilation or installation might be performed using any of a variety of generally available compilers, installation programs, compression/decompression utilities, or the like.

It will be apparent to those skilled in the art that substantial variations may be made in accordance with specific requirements. For example, customized hardware—such as programmable logic controllers, field-programmable gate arrays, application-specific integrated circuits, or the like—might also be used. In some cases, particular elements might be implemented in hardware, software (including portable software, such as applets, etc.), or both. Further, connection to other computing devices such as network input/output devices may be employed.

As mentioned above, in one aspect, some embodiments may employ a computer system, such as the computer system 700, to perform methods in accordance with various embodiments of the invention. According to a set of embodiments, some or all of the procedures of such methods might be performed by the computer system 700 in response to processor 710 executing one or more sequences of one or more instructions. The one or more instructions might be incorporated into the operating system 740 or other code that may be contained in the working memory 735, such as an application program 745. Such instructions may be read into the working memory 735 from another computer readable medium, such as one or more of the storage devices 725. Merely by way of example, execution of the sequences of instructions contained in the working memory 735 might cause the one or more processors 710 to perform one or more procedures of the methods described herein.

The terms "machine readable medium" and "computer readable medium," as used herein, refer to any medium that participates in providing data that causes a machine to operate in a specific fashion. In an embodiment implemented using the computer system 700, various computer readable media might be involved in providing instructions or code to the one or more processors 710 for execution, might be used to store and/or carry such instructions/code such as signals, or both. In many implementations, a computer readable medium is a non-transitory, physical, or tangible storage medium. Such a medium may take many forms, including, but not limited to, non-volatile media, volatile media, and transmission media. Non-volatile media includes, for example, optical disks, magnetic disks, or both, such as the storage devices 725. Volatile media includes, without limitation, dynamic memory, such as the working memory 735. Transmission media includes, without limitation, coaxial cables, copper wire and fiber optics, including the wires that comprise the bus 705, as well as the various components of the communication subsystem 730, or the media by which the communications subsystem 730 provides communication with other devices. Hence, transmission media can also take the form of waves, including without limitation radio, acoustic, or light waves, such as those generated during radio-wave and infra-red data communications.

Common forms of physical or tangible computer readable media include, for example, a floppy disk, a flexible disk, a hard disk, magnetic tape, or any other magnetic medium; a CD-ROM, DVD-ROM, or any other optical medium; punch cards, paper tape, or any other physical medium with patterns of holes; a RAM, a PROM, an EPROM, a FLASH-EPROM, or any other memory chip or cartridge; a carrier wave; or any other medium from which a computer can read instructions or code.

Various forms of computer readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700. These signals, which might be in the form of electromagnetic signals, acoustic signals, optical signals and/or the like, are all examples of carrier waves on which instructions can be encoded, in accordance with various embodiments of the invention.

The communications subsystem 730 (and/or components thereof) generally will receive the signals, and the bus 705 then might carry the signals (and/or the data, instructions, etc. carried by the signals) to the working memory 735, from which the processor(s) 705 retrieves and executes the instructions. The instructions received by the working memory 735 may optionally be stored on a storage device 725 either before or after execution by the processor(s) 710.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture, but instead can be implemented on any suitable hardware, firmware, and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. An apparatus, comprising:
a first input configured to receive data signals at a first frequency band over at least one wire in a data cable in a data network;
a second input configured to receive plain old telephone service ("POTS") voice signals;
a frequency shifter configured to upband the POTS voice signals received at the second input to a second frequency band, which is different from the first frequency band;
a signal combiner configured to combine the data signals at the first frequency band received at the first input with the upbanded POTS voice signals at the second frequency band over the at least one wire in the data cable; and
a signal processor configured to perform signal processing on the upbanded POTS voice signals for interference mitigation, wherein performing signal processing on the upbanded POTS voice signals for interference mitigation comprises duplicating the upbanded POTS voice signals and transmitting the duplicated upbanded POTS voice signals over two or more wires in the data cable in the data network.

2. The apparatus of claim 1, further comprising:
a spectrum analyzer configured to monitor frequencies above a specified frequency threshold for a center frequency at which a minimal amount of signal is detected, and to send a control signal to the frequency shifter to upband the POTS voice signals such that the second frequency band is centered on the center frequency.

3. The apparatus of claim 2, wherein the specified frequency threshold is 100 MHz.

4. The apparatus of claim 2, wherein the specified frequency threshold is 250 MHz.

5. The apparatus of claim 2, wherein the spectrum analyzer scans the data network for noise to identify an appropriate spectrum to which to upband the POTS voice signals.

6. The apparatus of claim 1, further comprising:
a signal splitter configured to separate the data signals at the first frequency band from the upbanded POTS voice signals at the second frequency band, after transmission through the data cable in the data network,
wherein the frequency shifter is further configured to retrieve the POTS voice signals by downbanding the upbanded POTS voice signals after the upbanded POTS voice signals are separated from the data signals by the signal splitter.

7. The apparatus of claim 6, wherein the apparatus is configured to:
provide the retrieved POTS voice signals to a receiving POTS telephone.

8. The apparatus of claim 6, wherein the apparatus is configured to:
provide the retrieved POTS voice signals to a POTS telephone network.

9. The apparatus of claim 1, wherein the data cable employed in the data network includes one or more of Category 5 ("Cat 5") twisted pair cable, Enhanced Category 5 ("Cat 5e") twisted pair cable, Category 6 ("Cat 6") twisted pair cable, Augmented Category 6 ("Cat 6a") twisted pair cable, Category 7 ("Cat 7") twisted pair cable, or Augmented Category 7 ("Cat 7a") twisted pair cable.

10. The apparatus of claim 1, wherein the data network employs all pairs of wires in the twisted pair cable for transmitting the data signals.

11. The apparatus of claim 1, wherein performing signal processing on the upbanded POTS voice signals for interference mitigation comprises identifying a pair of wires in the data cable having the least interference level, and transmitting the upbanded POTS voice signals over the identified pair of wires in the cable.

12. The apparatus of claim 1, wherein performing signal processing comprises implementing one or more of spread spectrum techniques, error correction techniques, or notch filtering techniques.

13. The apparatus of claim 1, wherein the data network is a local area network ("LAN").

14. The apparatus of claim 1, wherein the data network is one of a 1 Gbps Ethernet network or a 10 Gbps Ethernet network.

15. The apparatus of claim 1, wherein the second input receives the POTS voice signals from a transmitting POTS telephone.

16. The apparatus of claim 1, wherein the second input receives the POTS voice signals from a POTS telephone network.

* * * * *